United States Patent [19]

Güssefeld et al.

[11] 4,134,425

[45] Jan. 16, 1979

[54] DEVICE FOR DISTRIBUTING FLOWING MEDIA OVER A FLOW CROSS SECTION

[75] Inventors: Horst Güssefeld, Uttenreuth; Heinz Christoph, Nüremberg, both of Germany

[73] Assignee: Siemens Aktiengesellschaft, Munich, Germany

[21] Appl. No.: 776,867

[22] Filed: Mar. 11, 1977

[30] Foreign Application Priority Data

Mar. 12, 1976 [DE] Fed. Rep. of Germany ....... 2610556

[51] Int. Cl.² .............................................. F16K 3/32
[52] U.S. Cl. .............................. 137/625.3; 137/625.31
[58] Field of Search ....................... 137/625.31, 625.3; 251/206, 208

[56] References Cited

U.S. PATENT DOCUMENTS

| | | | |
|---|---|---|---|
| 659,514 | 10/1900 | Duffy | 137/625.31 X |
| 1,238,433 | 8/1917 | Pedersen | 137/625.31 X |
| 2,443,071 | 6/1948 | Honerkamp et al. | 137/625.3 |
| 3,023,775 | 3/1962 | Becker | 137/625.3 X |

Primary Examiner—Arnold Rosenthal
Attorney, Agent, or Firm—Kenyon & Kenyon, Reilly, Carr & Chapin

[57] ABSTRACT

A device for distributing flowing media over a flow cross section comprising a distributor plate extending over the flow cross section and having a multiplicity of openings over its entire extent. The device further includes a cover plate having passages distributed over its entire extent and movably arranged relative to the distributor so as to be able to determine the free passage cross section of all the openings of the distributor plate. The device can be arranged advantageously, at the input of a reaction chamber with a catalytic charge, in order to distribute the reactants over the cross section of the catalytic chamber.

4 Claims, 2 Drawing Figures

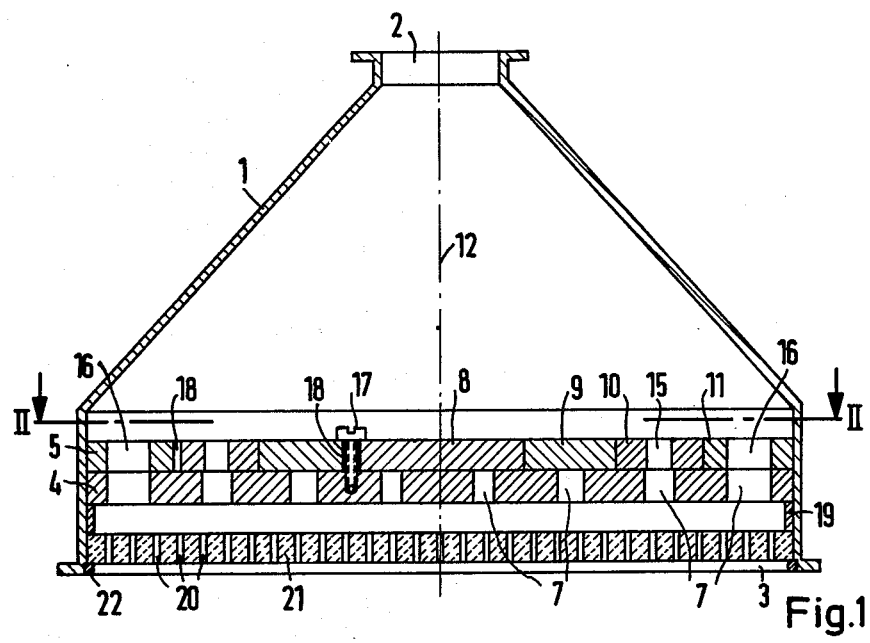
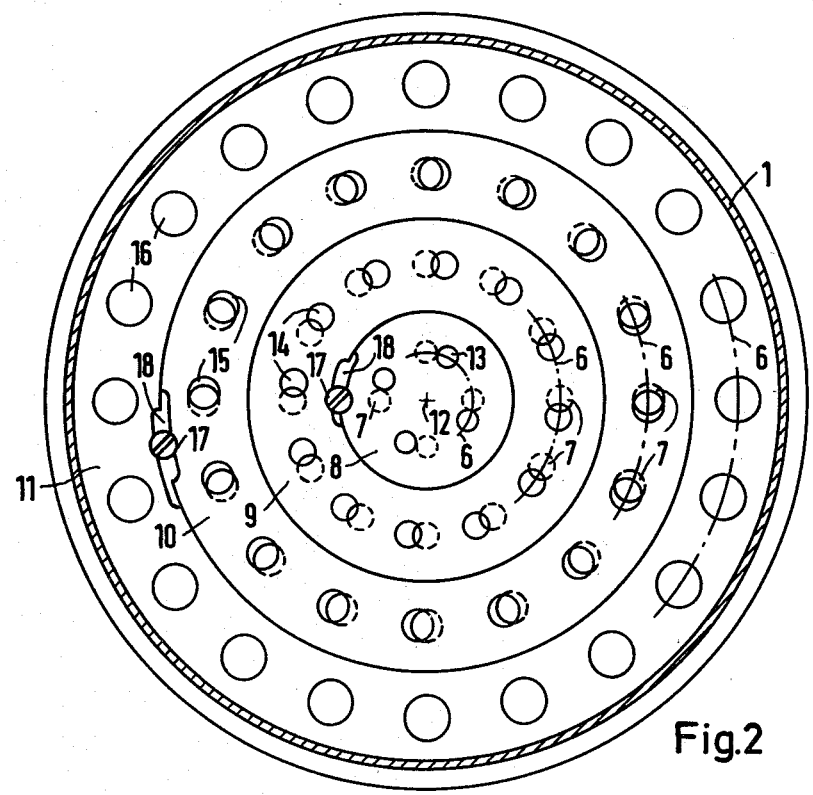

DEVICE FOR DISTRIBUTING FLOWING MEDIA OVER A FLOW CROSS SECTION

BACKGROUND OF THE INVENTION

1. Field of the Invention

The invention relates to a device for distributing flowing media over a flow cross section and, in particular, to a device comprising a distributor plate which extends over the flow cross section and has a multiplicity of openings, and a cover plate having passages and arranged so as to determine the free passage cross section of all openings of the distributor plate.

2. Description of the Prior Art

Devices of the above type are required, for example, in installations for chemical processes, where in a chamber filled with packing, the packing is to be brought into contact with a gaseous or liquid medium as uniformly as possible. They are also used when aerating liquids with gases where it is necessary to introduce the gas into the chamber filled with liquid with a distribution as uniform as possible. Finally, such devices also find use in applications in which a cylindrical chamber filled with a catalyst is to be supplied from a narrower supply pipe of gaseous reactants, in such a manner that the reactants are distributed over the entire chamber cross section as uniformly as posssible, so that the catalyst is loaded as uniformly as possible.

According to the investigation by Hagen and Poiseuille, there is, in media flowing pipes, usually a core flow with increased flow rate in the center of the pipe, but a decelerated flow with low flow rate at the walls of the pipe. If the pipes are flared out, e.g., if a narrow supply pipe is enlarged to the input cross section of a chamber, then turbulence is created in the outer zones of the core flow, which leads to a further disturbance of the distribution in the vicinity of the pipe walls.

In order to distribute a flowing medium over a flow cross section, the above-mentioned prior art devices, as above-noted, typically employ a distributor plate which extends over the entire flow cross section and which has a multiplicity of openings. Such a distributor plate causes the flowing medium to back up and, thus, to distribute over the plate openings. Its effectiveness, however, depends heavily on the prevailing flow conditions. In particular, if, for a given size and arrangement of the plate openings, the mass throughput through the device is too low, a sufficient backing-up effect and distribution of the media will not occur. Conversely, with too large a mass throughput, the backing-up effect of the distributor surface is so large that a substantial pressure and energy loss occurs at the distributor, which is undesirable in many applications. Added to the latter, is the fact that the effectiveness of the distributor plate also depends to a considerable extent on the flow conditions following the distributor surface. Thus, the flow resistance can increase in certain regions, for example, in a packing bed following the distributor surface, due to impurities. As a result, the mass throughput through these regions drops and the desired uniform distribution is distributed.

German Auglesgeschrift No. 1,138,290 discloses a multi-stage device for breaking down high pressures and for regulating media flowing under high pressure which contains in each stage a stationary seating part with throttle openings and an associated movable closing member, by which the throttle openings can be released or shut off. The closing member may be realized as a piston slider, a plane (gate) slider or a rotary slider. The device serves to dissipate the pressure energy of the flowing media with as little vibration and noise as possible as well as without forming vortices; therefore, a pressure loss as high as possible is desired. The throttle openings can be arranged in two opposite quadrants of a disk-like member forming the seating part, the closing member being designed as a cover plate and having sector-shaped cutouts in two opposite quadrants. By rotating the cover plate, the openings are covered up in part or totally, and the total passage cross section of all openings is thus determined. The seating part and the closing member can also be designed as concentric rings with openings and passages arranged along their circumference, whereby the free passage cross section of each opening can be varied by rotation of the closing member. With such an arrangement, uniform distribution of the flowing medium over the entire flow cross section of the device is not achieved.

It is an object of the present invention to provide a device for distributing the media flowing from a supply pipe so that it can be distributed over the flow cross section uniformly or in any other desired manner. It is a further object of the invention to provide such a device so that it can be adapted to flow conditions prevailing in a particular case in such a manner that pressure loss is kept low.

SUMMARY OF THE INVENTION

In accordance with the principles of the present invention the above and other objectives are accomplished in a device comprising a distributor plate which extends over the entire flow cross section and has openings distributed over its entire extent. The device further includes a cover plate which has openings distributed over its entire extent and which is movably arranged relative to the distributor plate so as to determine the free passage cross section of all the openings of the distributor plate.

With the device configured as aforesaid, the openings of the distributor plate are accessible to the flowing medium only to the extent that they are overlapped by the corresponding passages of the cover plate and are thus released. The pressure difference occurring at the overlaps increases with decreasing size of the overlapping area. For given mass throughputs through the device, the overlaps can thus be chosen so that the occurring pressure loss does not increase above the extent required for the development of the distribution. Thus, for smaller mass flow, the small overlaps can be adjusted, while for larger mass flows, the larger overlaps can be adjusted. The relative position of the distributor plate and the cover plate can then be fixed by spot welding or by screws.

Because of its simple settability, the device of the present invention can be used in installations which, while having equal input cross sections, are otherwise designed differently and in which different flow conditions prevail. For these installations, a single type of configuratiion of the present device capable of mass production is therefore sufficient.

In the embodiment of the device to be disclosed hereinafter, the cover plate comprises a rotatable circular disk and rotatable circular rings which surround the former concentrically. Through appropriate rotation of the rings, the local flow resistance at the circular disk and at the rings can be varied independently of one another. The flow resistance presented by the device to different regions in the cross section of a flowing medium thus becomes a function of the location of the regions on the distributor surface. This function can be chosen and adapted to the prevailing flow conditions so that the flowing medium flows through the openings and passages of the distributor and cover plate so as to realize a desired flow distribution for the medium. If, for instance, the flowing medium is to be introduced into a catalytic chamber in such a manner that the core flow passing through in the vicinity of the chamber axis is slowed down and the flow rate in the vicinity of the chamber walls is increased, this can be achieved by positioning the circular disk and the rings of the cover plate so that the passages in the circular disk and the passages in the inner rings of the cover plate barely overlap their corresponding openings in the distributor plate, while the passages in the outer rings of the cover plate significantly overlap their corresponding openings in the distributor plate.

Moreover, should impurities which lead, for example, in the vicinity of the chamber walls, to an increase of the flow resistance, be deposited in the chamber, then the disturbance of the uniform flow caused thereby can be corrected by a corresponding increase of the overlaps of the passages in the inner rings with their corresponding openings in the distributor plate.

The distributor plate of the device of the present invention may be a plane perforated disk, but it may also be of domed or conical shape, the cover plate having the same geometrical shape. Advantageously, the openings and passages in the distributor plate and cover plate may be circular and may have their centers situated on concentric circles about the center of the cover plate. Moreover, in such case, the passages and openings on each circle may have the same spacing from each other and may have diameters which are less than one-half the center to center spacing. Thereby, complete, partial or negligible overlap of the passages with the openings can be set.

Preferably, in the present device the passages in the cover plate and the openings in the distributor plate are designed and arranged in such a manner that they are in complete coincidence with each other for a corresponding position of the rings and the circular disk.

BRIEF DESCRIPTION OF THE DRAWINGS

The above and other features and aspects of the present invention will become more apparent upon reading the following detailed description taken in conjunction with the accompanying drawings, in which:

FIG. 1 shows, in cross section, a funnel-shaped tube section into which has been inserted a device according to the principles of the present invention; and FIG. 2 shows a cross section through the device in FIG. 1 taken along ghe section line II—II.

DETAILED DESCRIPTION

FIG. 1 shows a device for distributing flowing medium in accordance with the principles of the present invention. The device is disposed within a conically flared-out guide tube 1 having an inlet 2 at its narrow end and an outlet 3 at its flared-out end. The device comprises a circular distributor plate 4 and a cover plate 5 disposed above the plate 4, both plates being arranged at the flared-out end of the tube 1. The distributor plate 4 has circular openings 7 which are situated on four concentric circles 6 and the diameters of which become increasingly larger from the center outward. As shown, the openings 7 situated on a given circle 6 have equal diameters and have their centers spaced one from the other by a constant amount. Moreover, the spacing between the centers of the openings on a given circle is at least twice the diameter of the openings situated on that circle.

The cover plate 5 comprises a central circular disk 8 and three rings 9, 10 and 11 which surround and are concentric with the disk 8. The latter disk and rings 9, 10 and 11 are arranged so as to be rotatable relative to the distributor plate 4 about a common axis of rotation 12. Moreover, the disk and the rings are provided with passages 13, 14, 15 and 16, which match the openings 7 in the distributor plate in such a manner that they come into exact coincidence with the former if the circular disk 8 and the rings 9, 10 and 11 are appropriately positioned. In the position shown in FIGS. 1 and 2, the circular disk 8 is rotated relative to the distributor plate 4 so that its passages 13 do not overlap with the openings of the distributor plate 4. Moreover, the rings 9, 10 and 11 are rotated so that the passages 14 of the inner ring 9 overlap only slightly with their associated openings 7 of the distributor plate 4, the passages 15 of the middle ring 15 overlap almost completely their corresponding openings 7 in the distributor plate 4 and the openings 16 of the outer ring 11 completely overlap this corresponding openings 7 of the distributor plate 4.

The device of the present invention comprising the distributor plate 4 and the cover plate 5 with their openings and passages can be manufactured, for example, by first making two identical perforated plates. The circular disk 8 and the rings 9, 10 and 11 can then be punched out from one of the perforated plates.

In order to fix the position of the circular disk 8 and the rings 9, 10 and 11 relative to the distributor plate 4, screws 17 are provided which engage the distributor plate 4 through respective slots 18 in the circular disk and the rings. These slots have the shape of circular arcs concentric with the center of the circular disk 8 and are of sufficient length to permit a rotation of the disk and the rings, so that the overlap of the passages therein with their respective openings in the distributor plate 4 can be varied from a complete to negligible overlap. By turning the screws 17 into the distributor plate, the circular disk 8 and the rings 9, 10 and 11 are clamped between the screw head and the distributor plate.

Depending upon the nature of the media to be distributed, the device of the present invention can be made of different materials. For distributing inorganic media of low temperature, a distributor and cover plate made of plastic and formed by injection molding may be used; for organic substances at high temperatures, metal or ceramic plates may be used.

The device of the present invention can be used to advantage to feed a mixture of gaseous reactants coming from a narrower feed pipe to a cylindrical reaction chamber, where the input cross section of the reaction chamber is larger than the cross section of the feed pipe and the reaction chamber contains a catalyst which is to be loaded as uniformly as possible. Such catalytic reaction chambers are used, for example, in reformed-gas generators which are described, for instance, in the German Offenlegunsschriftens Nos. 2,103,008 and 2,135,650. In such reformed-gas generators, hydro-carbon containing liquid fuel, e.g., evaporated or atomized gasoline, is to be reacted with an oxygen-containing gas, e.g., air, to form a fuel gas (reformed gas). The fuel gas generated in such gas generators is particularly well suited for operating internal-combution engines.

If, for example, the apparatus of FIGS. 1 and 2 is arranged to precede such a gas generator, the gasoline-/air mixture entering the tube section 1 through the inlet 2 will be slowed down in the region of the core flow, i.e., in the vicinity of the axis 12, for the position of the circular disk 8 and the rings 9, 10 and 11 shown in FIG. 2. The increased cross sections of the openings toward the edge of the distributor plate do not bring about a uniform distribution over the input corss section of the catalytic chamber, but a distribution, in which the flow in the vicinity of the chamber wall is increased over the flow in the vicinity of the axis 12. Thereby, an increased throughput and, for instance, in the case of an exothermic reaction, increased heat development, will be achieved in the vicinity of the chamber wall, in order to equalize the heat radiation and other heat losses of the chamber wall.

In case soot and other impurities are deposited in the regions of the catalytic charge starting from the chamber wall, which would lead to increased flow resistances in such regions if the gas generator is operated for extended periods of time, provision may also be made to adapt the distributor action of the arrangement at certain intervals to the changed flow conditions in the chamber.

Returning now to the discussion of FIGS. 1 and 2, as shown, the distributor plate 4 rests, via spacers 19, on a ceramic plate 21 which includes passage canals 20. The ceramic plate 20, in turn, rests on a snap ring 22 arranged at the end of the flared-out end 3 of the guide tube 1. The ceramic plate 21 brings about the ultimate distribution of the emanating media flow and, if the device is used in a reformed-gas generator, serves at the same time as protection against backfiring, in order to protect the flammable gasoline/air mixture in the guide tube 1 against the high temperatures of the catalytic chamber.

What is claimed is:

1. A device for distributing flowing medium over a flow cross section comprising
    a distributor plate which extends over the flow cross section and which has a multiplicity of openings distributed over its entire extent;
    a cover plate which has passages distributed over its entire extent and which is movably arranged relative to said distributor plate so as to determine the total free passage cross section of all the openings of said distributor plate, said cover plate including;
    a rotatable disk;
    and a number of rings concentric with and surrounding said disk, each of said rings being rotatable relative to said disk and relative to one another.

2. A device in accordance with claim 1 wherein:
said disk is circular.

3. A device in accordance with claim 1 wherein:
said openings and passages are circular and have centers situated on concentric circles about the center of the cover plate, and the openings and passages situated on given concentric circle are equally spaced from each other and have diameters which are less than one-half said spacing.

4. A device in accordance with claim 1 wherein
said passages and openings are arranged so that they can be brought into coincidence with each other completely.

* * * * *